US009628376B2

(12) United States Patent
Oshima et al.

(10) Patent No.: US 9,628,376 B2
(45) Date of Patent: Apr. 18, 2017

(54) COMMUNICATION SYSTEM, SWITCH, CONTROLLER, METHOD FOR CONSTRUCTING A CONTROL CHANNEL AND PROGRAM

(71) Applicant: NEC Corporation, Minato-ku, Tokyo (JP)

(72) Inventors: Takahiro Oshima, Tokyo (JP); Fei Gao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 14/766,008

(22) PCT Filed: Feb. 25, 2014

(86) PCT No.: PCT/JP2014/054568
§ 371 (c)(1),
(2) Date: Aug. 5, 2015

(87) PCT Pub. No.: WO2014/132967
PCT Pub. Date: Sep. 4, 2014

(65) Prior Publication Data
US 2015/0381476 A1 Dec. 31, 2015

(30) Foreign Application Priority Data
Feb. 26, 2013 (JP) ................... 2013-036091

(51) Int. Cl.
H04L 12/703 (2013.01)
H04L 12/46 (2006.01)
(Continued)

(52) U.S. Cl.
CPC .......... H04L 45/28 (2013.01); H04L 12/4625 (2013.01); H04L 12/6418 (2013.01);
(Continued)

(58) Field of Classification Search
CPC ... H04L 12/24; H04L 12/741; H04L 12/1886; H04L 41/0668; H04L 45/28; H04L 45/38; H04L 45/74; H04W 4/00
See application file for complete search history.

(56) References Cited

U.S. PATENT DOCUMENTS 7,742,457 B2 * 6/2010 Ver Steeg ........... H04L 12/1886
370/338

FOREIGN PATENT DOCUMENTS

WO 2011/083346 A1 7/2011
WO 2011/083785 A1 7/2011
(Continued)

OTHER PUBLICATIONS

International Search Report for PCT Application No. PCT/JP2014/054568, mailed on May 13, 2014.
(Continued)

Primary Examiner — Andrew Lai
Assistant Examiner — Leon Andrews

(57) ABSTRACT

The controller sets control information in a switch over a control channel to control the switch. The switch includes a packet processing unit that processes a packet received based on control information as set from the controller, and a Layer-2 forwarding unit that learns an input port of a control packet between the controller and a neighboring switch or switches and that forwards the control packet on the basis of learned results. The switch also includes an alternative control channel construction unit that, on detecting a disconnection of the control channel, sends a packet requesting a resolution of a Layer-2 address of the controller to the neighboring switch or switches. The alternative control channel construction unit acquires the Layer-2 address from the controller via the neighboring switch or switches and transmits the control packet to the controller using the Layer-2 address acquired to construct a second control channel between the switch and the controller.

9 Claims, 17 Drawing Sheets

(51) Int. Cl.
  *H04L 12/64* (2006.01)
  *H04L 12/24* (2006.01)
  *H04L 12/721* (2013.01)
  *H04L 12/741* (2013.01)
  *H04L 12/717* (2013.01)

(52) U.S. Cl.
  CPC .......... *H04L 41/0668* (2013.01); *H04L 45/38* (2013.01); *H04L 45/42* (2013.01); *H04L 45/74* (2013.01)

(56) References Cited

FOREIGN PATENT DOCUMENTS

| | | |
|---|---|---|
| WO | 2011/083846 A1 | 7/2011 |
| WO | 2012/165446 A1 | 12/2012 |

OTHER PUBLICATIONS

Nick McKeown and seven others: "OpenFlow: Enabling Innovation in Campus Networks", Mar. 14, 2008, Cited in the Specification.

Open Networking Foundation, "Open Flow Switch specification", Version 1.3.1, Wiew Protocol 0x04, Sep. 6, 2012, Cited in the Specification.

Toshio Koide et al., "A study on the automatic construction mechanism of control network in OpenFlow-based network", NS2009-165, Mar. 2010, Cited in the Specification.

Japanese Office Action for JP Application No. 2015-502936 mailed on Apr. 12, 2016 with English Translation.

"Split Architecture for Large Scale Wide Area Networks", SPARC, ICT-258457, Deliverable D3.3, Wolfgang John, Aug. 2012, pp. 1-129.

Extended European Search Report for EP Application No. EP14756566.7 dated on Aug. 25, 2016.

* cited by examiner

FIG. 8

| MATCH CONDITIONS | INSTRUCTIONS | PRIORITY LEVEL |
|---|---|---|
| SMAC = MAC ADDRESS OF CONTROLLER<br>DMAC = MAC ADDRESS OF PORT #1-2 OF SWITCH 10-1 | OUTPUT AT LOCAL PORT | 255 |
| SMAC = MAC ADDRESS OF CONTROLLER<br>DMAC = MAC ADDRESS OF PORT #1-3 OF SWITCH 10-1 | OUTPUT AT LOCAL PORT | 255 |
| ... | ... | ... |
| DMAC = MAC ADDRESS OF CONTROLLER | OUTPUT AT NORMAL PORT (LAYER-2 RESERVED PORT) | 15 |
| SMAC = MAC ADDRESS OF CONTROLLER | OUTPUT AT NORMAL PORT (LAYER-2 RESERVED PORT) | 7 |
| ... | ... | ... |

FIG. 10

| CONTROL CHANNEL CONNECTION DESTINATION SWITCH | RELAY SWITCH | |
|---|---|---|
| IP ADDRESS | IP ADDRESS | PORT NUMBER |
| IP ADDRESS OF SWITCH 10-1 | IP ADDRESS OF SWITCH 10-2 | PORT #2-1 OF SWITCH 10-2 |
| ... | ... | ... |

COMMUNICATION SYSTEM, SWITCH, CONTROLLER, METHOD FOR CONSTRUCTING A CONTROL CHANNEL AND PROGRAM

This application is a National Stage Entry of PCT/JP2014/054568 filed on Feb. 25, 2014, which claims priority from Japanese Patent Application 2013-036091 filed on Feb. 26, 2013, the contents of all of which are incorporated herein by reference, in their entirety.

TECHNICAL FIELD

Description of Related Application

The present application asserts priority rights based on JP Patent Application 2013-036091 filed in Japan on Feb. 26, 2013, the total contents thereof being incorporated by reference into the present Application.

This invention relates to a communication system, a switch, a controller, a method for constructing a control channel and a program. In particular, the present invention relates to a centralized control communication system provided with a controller, a switch, the controller, a method for constructing a control channel and a program.

BACKGROUND

Recently, a network in which the packet forwarding functions and the path control or the like control functions for network equipment are isolated from each other, is attracting attention. In such network, the network equipment takes charge of the packet forwarding functions, while a separate controller provided on an outer side of and at a distance from the network equipment takes charge of the control functions. By so doing, it is possible to construct a network which is easy to control while being high in flexibility.

A technique known as OpenFlow to implement the above mentioned centralized control network has been proposed in Non-Patent Literatures 1, 2. The OpenFlow comprehends communication as an end-to-end flow and manages path control, recovery from malfunctions, load balancing and optimization from one flow to another. An OpenFlow switch, shown as the specification in Non-Patent Literature 2, includes a secure channel over which the switch may communicate with an OpenFlow controller, and operates in accordance with a flow table which may be supplemented or modified that is instructed as necessary from the OpenFlow controller. In the flow table, a set of match conditions (Match Fields) for matching against a packet header, the flow statistics information (Counters) and a set of instructions that define the processing contents (Instructions) are defined from one flow to another. Reference may be made to '5.2 Flow Table' of Non-Patent Literature 2.

On reception of a packet, the OpenFlow switch retrieves the flow table to search for an entry having the match condition conforming to the header information of the received packet. See '5.3 Matching' of Non-Patent Literature 2. If, as a result of the search, the entry matching the received packet is found, the OpenFlow switch updates the flow statistics information (Counters), and executes the processing contents stated in an instruction field of the matching entry, such as transmitting the packet out a specified port or flooding/dropping the packet. If conversely no entry matching the received packet is found, the OpenFlow switch sends an entry setting request to the OpenFlow Controller over the secure channel, by way of a request for having the control information sent to it in order for the switch to process the received packet (Packet-In message). The OpenFlow switch receives the flow entry, in which processing contents are stated, and accordingly updates its flow table. In this manner, the OpenFlow switch forwards the packet, using the entry stored in the flow table as the control information.

In Non-Patent Literature 3, there is disclosed a system in which no network for control is provided and a control channel is provided in a network for data transmitted between switches. This system is termed below an 'in-band control system', see e.g., Non-Patent Literature 3.

Non-Patent Literature 1:
Nick McKeown and seven others: "OpenFlow: Enabling Innovation in Campus Networks", [online], [searched on January 9, Heisei25 (2013)], Internet <URL:http://www.openflow.org/documents/openflow-wp-latest.pdf>

Non-Patent Literature 2:
"Open Flow Switch specification", Version 1.3.1 (Wire Protocol OxO4), [online], [searched on January 9, Heisei25 (2013)], Internet <URL:https://www.opennetworking.org/images/stories/downloads/specification/openflow-spec-v1.3.1.pdf>

Non-Patent Literature 3:
'A study on the automatic construction mechanism of control network in OpenFlow-based network', by Toshio Koide and Hideyuki Shimonishi, Shingaku-Gihou, Society of Electronic Information Communication, a body corporate, NS2009-165 (2010-3), Vol. 109, No. 448, pp. 19-24, March 2010

SUMMARY

The following analysis is by the present invention. In the centralized control network, represented by the Non-Patent Literatures 1, 2, a high reliability is required of the control channel between the controller and the switch. If the control channel is disconnected, the switch that was so far controlled via the control channel ceases to be controlled from the controller and hence may no longer be controllable, thus occasionally causing a communication malfunction even though the switch remains connected to a data channel link.

As a method for enhancing the control channel reliability, a link redundancy enhancing technique, exemplified by LAG (Link Aggregation), may be used. However, the LAG suffers a problem that it is hard to realize high redundancy, because it is necessary to increase the number of the physical links in order to assure the enhanced redundancy.

With the Non-Patent Literature 3, each switch needs to be provided with a function to interpret a special frame. Moreover, the Non-Patent Literature 3 simply states that resistance against failure may be improved by iterating topology search operations periodically.

It is an object of the present invention to provide a means for automatic restoration at the time of disconnection of a control channel of the above mentioned centralized control network, and to provide a communication system, a switch, a controller, a method for constructing a control channel and a program that will contribute to improving resistance against failure of the centralized control network.

In a first aspect, there is provided a communication system including a controller and a switch. The controller sets control information in the switch over a control channel to control the switch. The switch includes a packet processing unit that processes a packet received on the basis of the control information as set from the controller, and a Layer-2 forwarding unit that learns an input port of a control packet between the controller and another switch or switches and that forwards the control packet on the basis of learned results. The switch also includes an alternative control channel construction unit that, on detecting a disconnection of the control channel, sends a packet requesting a resolution of a Layer-2 address of the controller to a neighboring switch or switches. The alternative control channel construction unit acquires the Layer-2 address from the controller via the neighboring switch or switches to construct a second control channel between the switch and the controller using the so acquired Layer-2 address.

In a second aspect, there is provided a switch including a packet processing unit that processes a packet received on the basis of control information as set in the switch from a controller over a control channel to control the switch, a Layer-2 forwarding unit that learns an input port of a control packet between the controller and another switch or switches so as to forward the control packet on the basis of learned results, and an alternative control channel construction unit that, on detection of a disconnection of the control channel, transmits a packet requesting a resolution of a Layer-2 address of the controller to a neighboring switch or switches, acquires the Layer-2 address from the controller via the neighboring switch or switches, and constructs a second control channel between the switch and the controller using the Layer-2 address acquired.

In a third aspect, there is provided a controller which constructs a second control channel in response to a request from a switch that has detected a disconnection of the control channel.

In a fourth aspect, there is provided a method for constructing a control channel comprising
a switch including a packet processing unit that processes a packet received on the basis of control information as set in the switch from a controller over a control channel to control the switch, and also including a Layer-2 forwarding unit that learns an input port of a control packet between the controller and another switch or switches so as to forward the control packet on the basis of learned results,
forwarding, on detection of a disconnection of the control channel, a packet requesting a resolution of a Layer-2 address of the controller to a neighboring switch or switches, acquiring the Layer-2 address from the controller via the neighboring switch or switches, and
constructing a second control channel between the switch and the controller using the Layer-2 address acquired. The present method is bound up with a particular machine which is a switch that processes a packet received on the basis of the control information that has been set over the control channel.

In a fifth aspect, there is provided a program that causes a computer mounted onboard a switch including a packet processing unit that processes a packet received on the basis of control information as set from a controller in the switch over a control channel to control the switch, and also including a Layer-2 forwarding unit that learns an input port of a control packet between the controller and another switch or switches so as to forward the control packet on the basis of learned results, to perform a processing of transmitting, on detection of a disconnection of the control channel, a packet requesting a resolution of a Layer-2 address of the controller to a neighboring switch or switches, a processing of acquiring the Layer-2 address from the controller via the neighboring switch or switches, and a processing of constructing a second control channel between the switch and the controller using the Layer-2 address acquired. It should be noted that the present program can be recorded on a computer-readable non-transient recording medium. That is, the present invention may be implemented as a computer program product.

According to the present invention, it is possible to contribute to improved resistance against failures of the centralized control networks.

BRIEF DESCRIPTION OF THE DRAWINGS

FIG. 8 is a tabulated view for illustrating the control information (flow entries) retained by the switch of the exemplary embodiment 1.

FIG. 10 is a tabulated view for illustrating the relay switch information retained by the controller of the exemplary embodiment 1.

PREFERRED MODES

A summary of a preferred mode of the present invention will now be described with reference to the drawings. It should be noted that symbols are entered in the summary merely as examples to assist in understanding and are not intended to limit the present invention to the modes illustrated.

Figure 1:
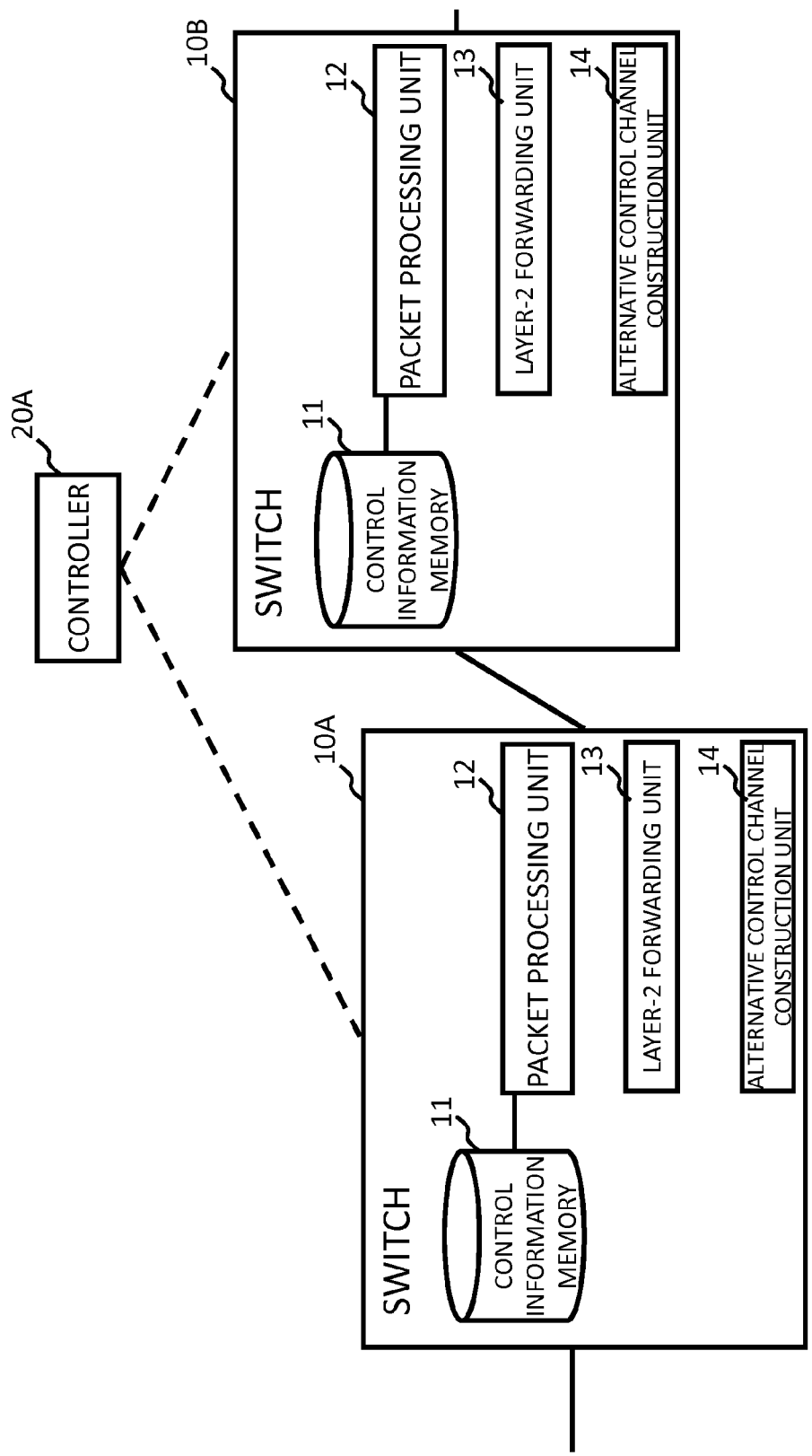
FIG. 1 is a block diagram showing a configuration of an exemplary embodiment.

Referring to FIG. 1, an exemplary embodiment of the disclosure of the present Application is implemented by switches 10A, 10B and a controller 20A that controls the switches 10A, 10B by setting a control information in the switches 10A, 10B via control channels indicated by broken lines in FIG. 1.

More concretely, the switch 10A (10B) includes a packet processing unit 12, a Layer-2 forwarding unit 13 and an alternative control channel construction unit 14. The packet processing unit processes a received packet based on the control information as set from the controller 20A. The Layer-2 forwarding unit learns an input port of a control packet between the controller and another switch or switches and transmits the control packet based on learned results.

Figure 2:
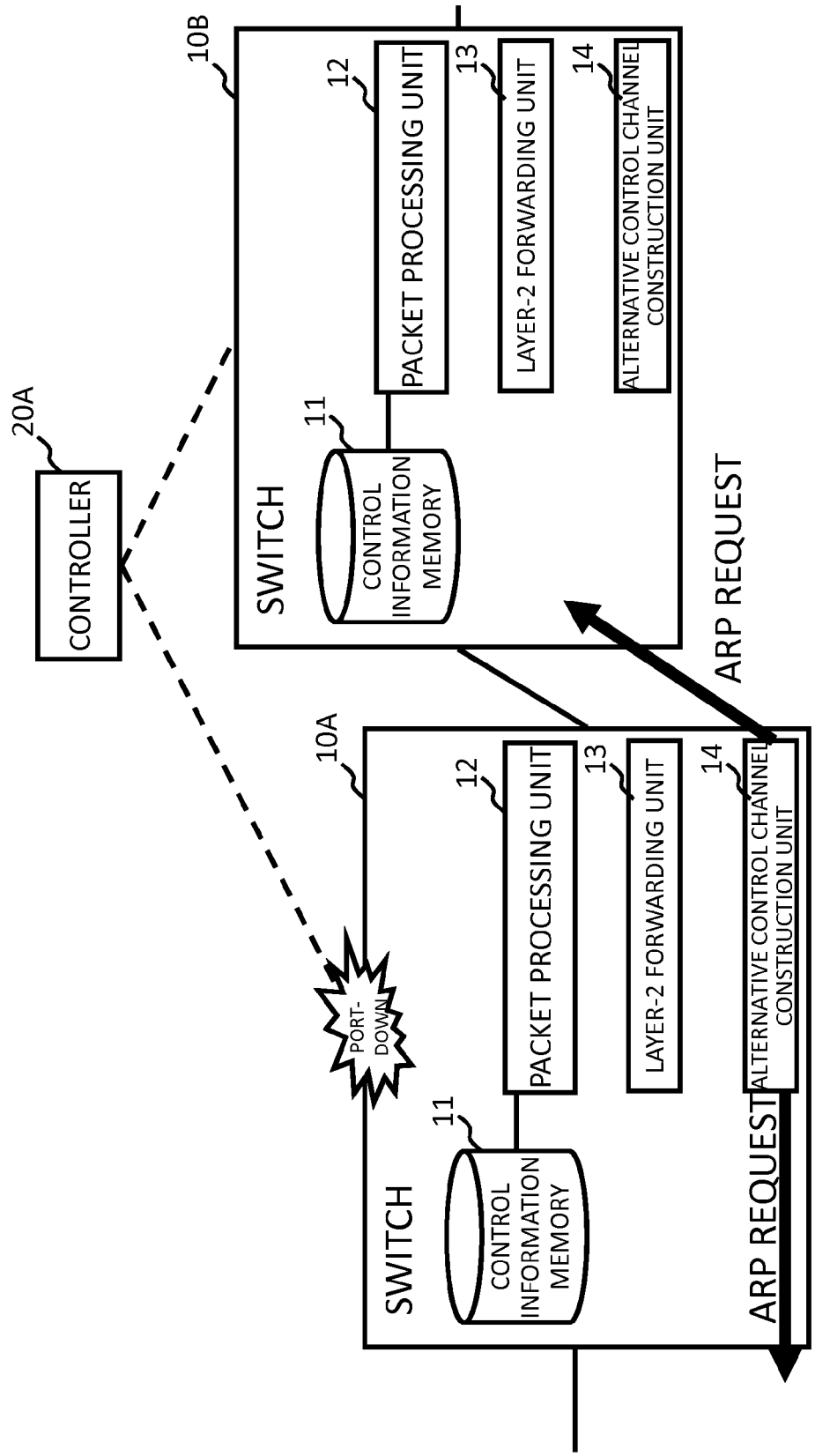
FIG. 2 is a block diagram for illustrating an operation of the exemplary embodiment.
Figure 3:
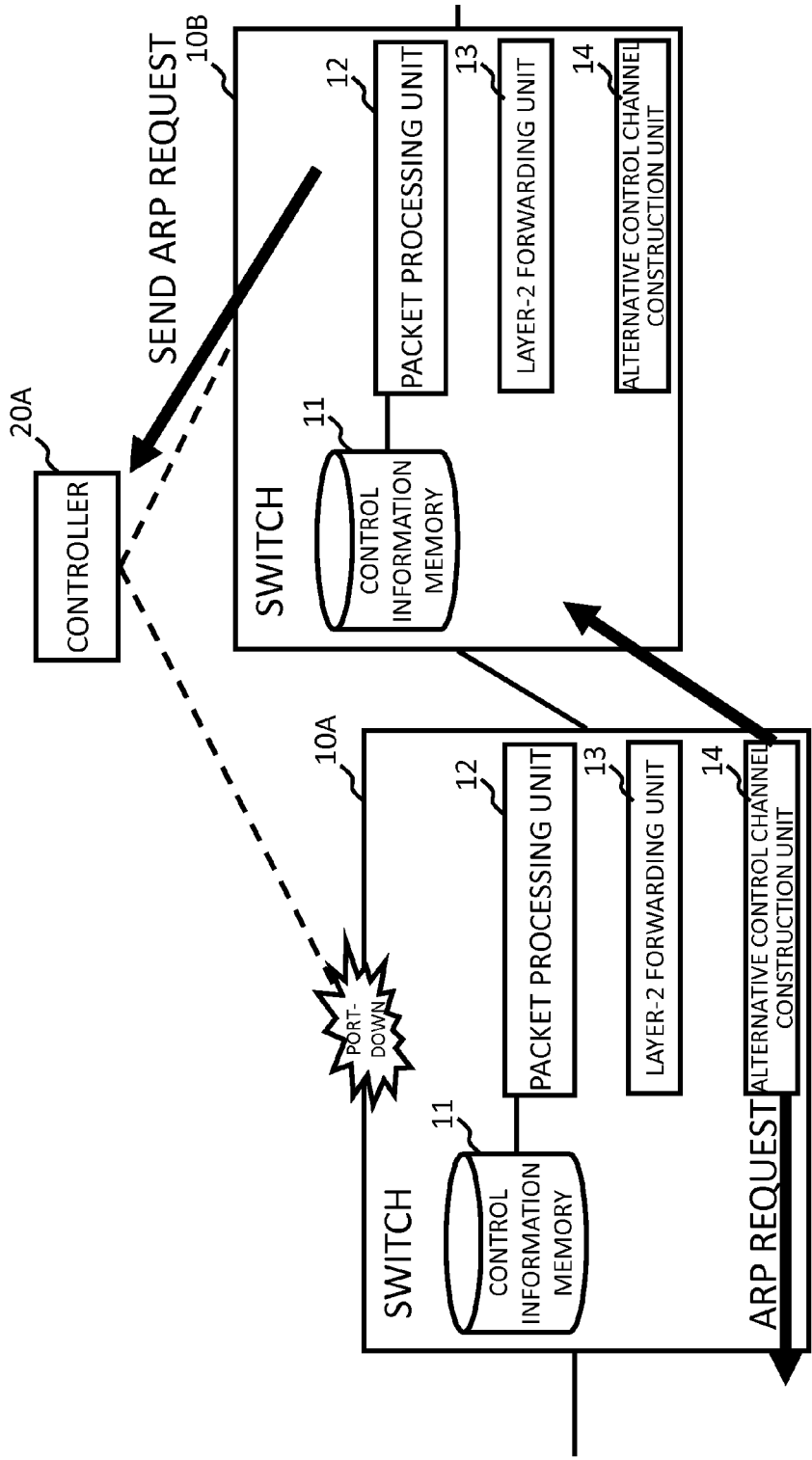
FIG. 3 is block diagram for illustrating the operation of the exemplary embodiment.
Figure 4:
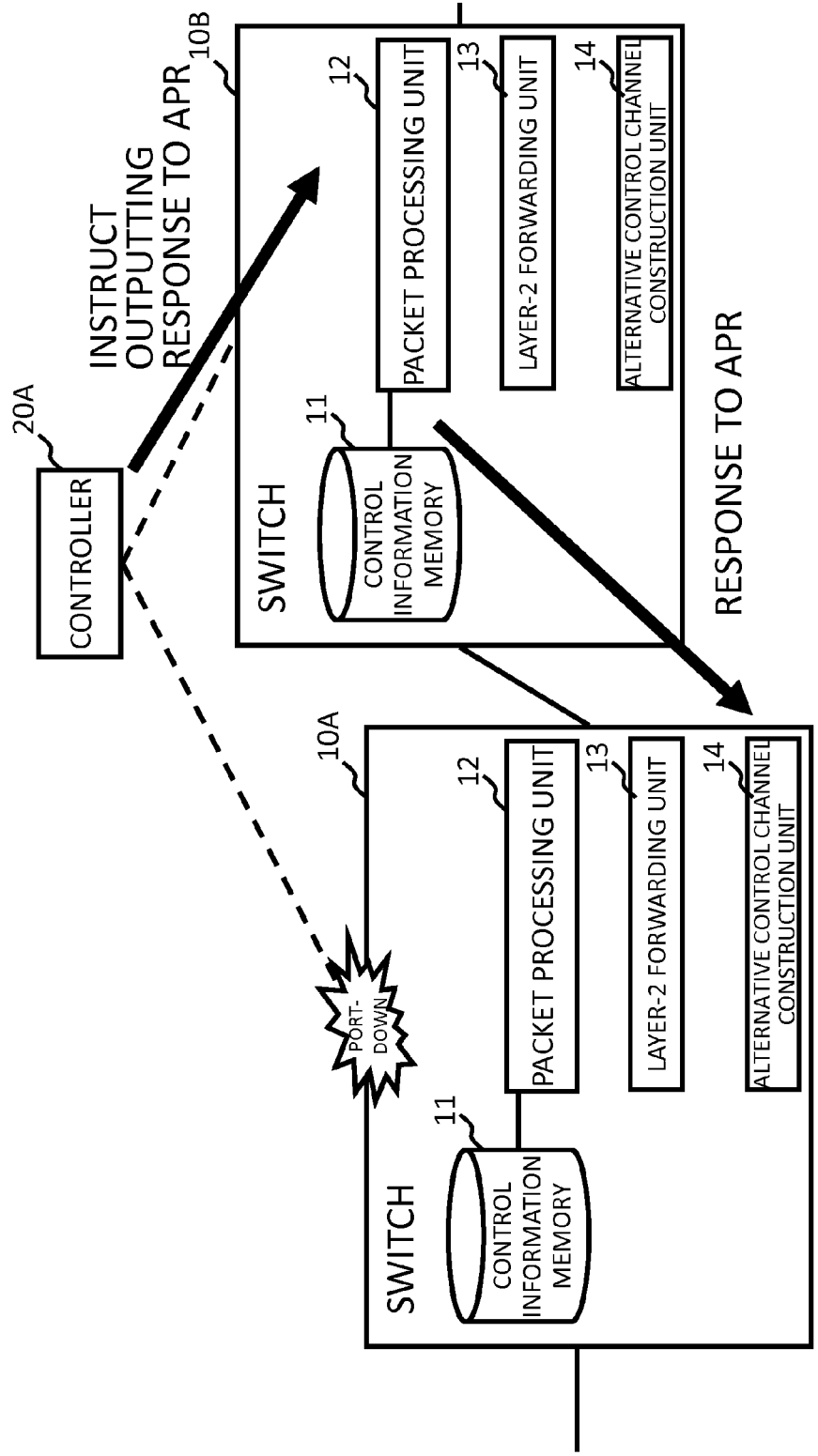
FIG. 4 is block diagram for illustrating the operation of the exemplary embodiment.
Figure 5:
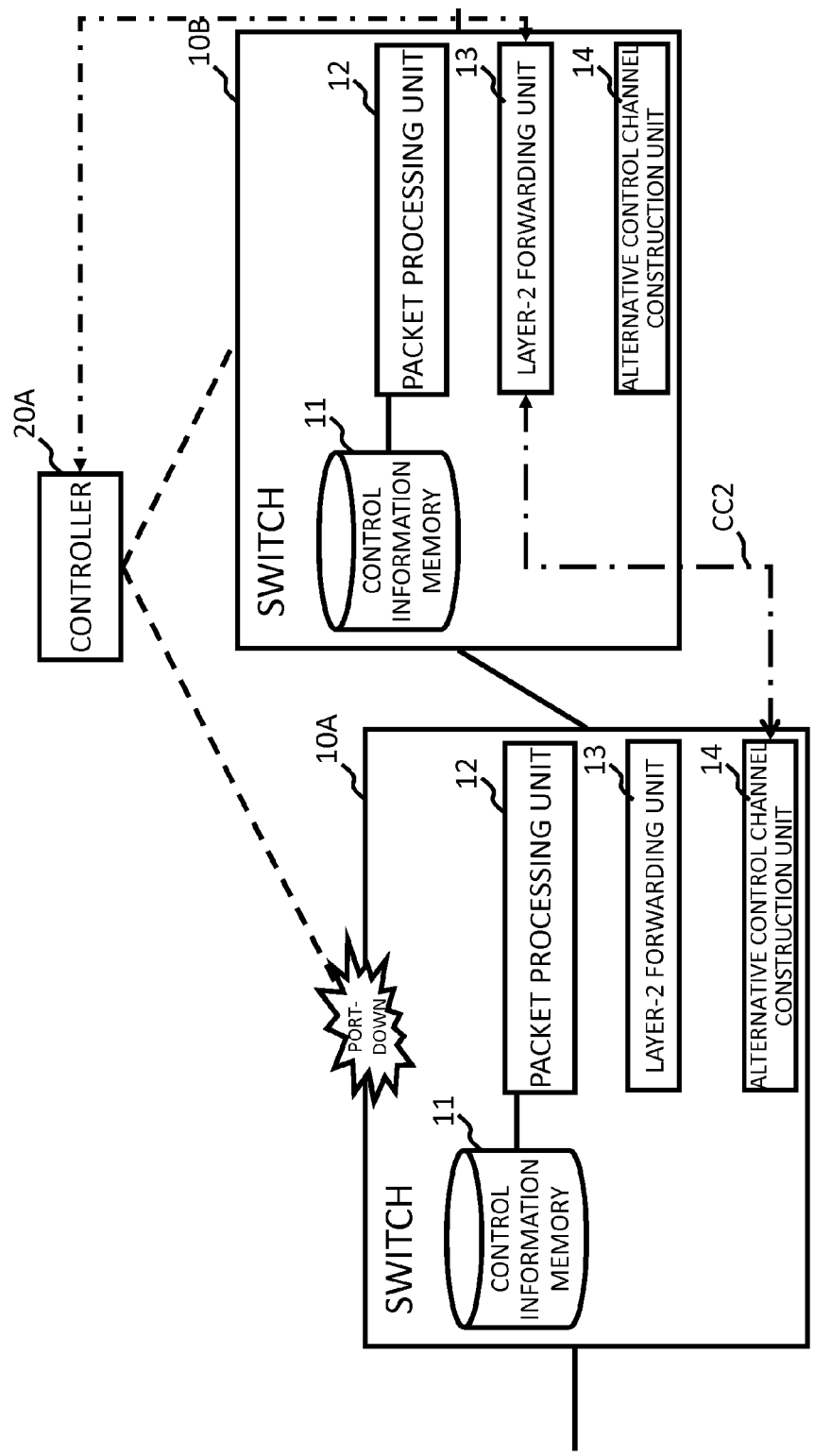
FIG. 5 is block diagram for illustrating the operation of the exemplary embodiment.

On detection of a disconnection of the control channel, the alternative control channel construction unit 14 transmits a packet requesting a resolution of the Layer-2 address of the controller to a neighbored switch or switches, as shown in FIG. 2. If a response to the packet requesting the resolution of the Layer-2 address of the controller is acquired (see FIG. 3 and FIG. 4), the alternative control channel construction unit 14 constructs a second control channel between it and the controller, using the Layer-2 address acquired (see FIG. 5). By the way, the control packet passed between the switch that detected the disconnection of the control channel and the controller 20A is relayed by the Layer-2 forwarding unit 13 of the switch located on the second control channel.

The above enables the alternative control channel, that is, the second control channel, to be constructed without using physical redundancy links exemplified by LAG.

Exemplary Embodiment 1

Figure 6:
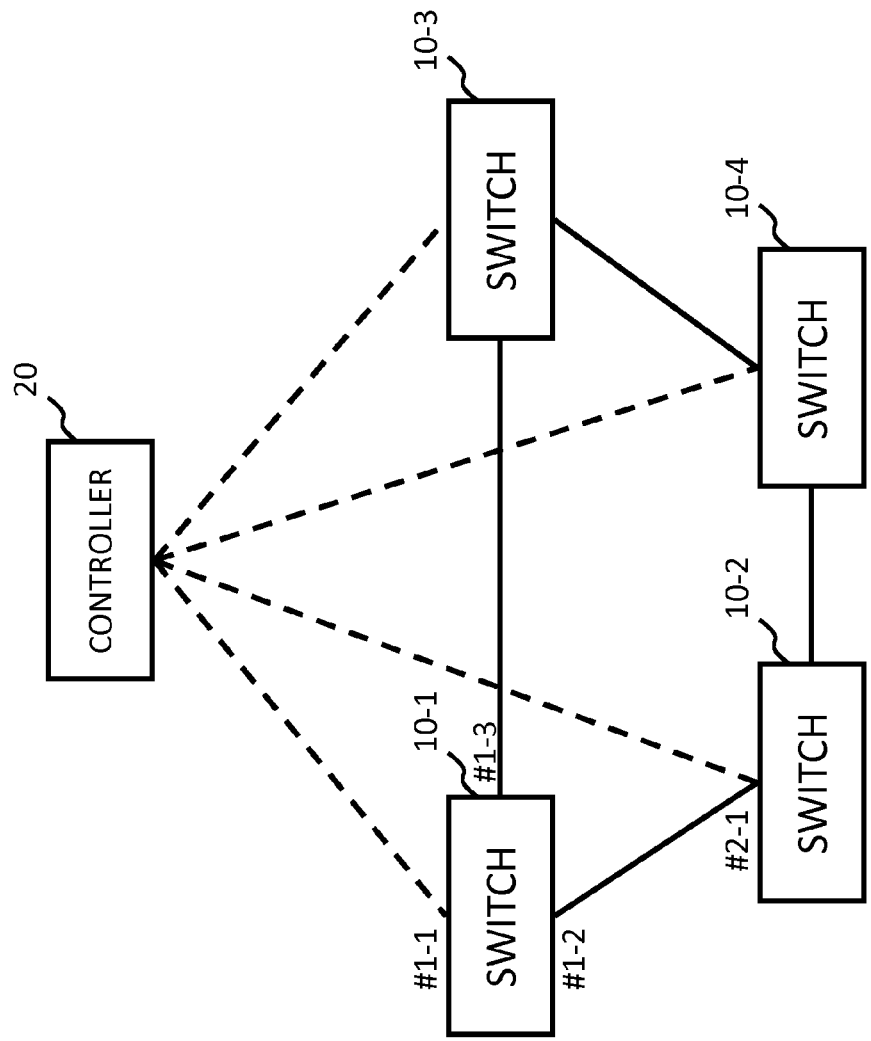
FIG. 6 is a block diagram showing a configuration of a communication system of an exemplary embodiment 1.

An exemplary embodiment 1 will now be explained in detail with reference to the drawings. FIG. 6 schematically shows a configuration of a communication system according to the exemplary embodiment 1. In FIG. 6, there are shown a plurality of switches 10-1 to 10-4 and a controller 20 that controls the switches 10-1 to 10-4 which are interconnected by links indicated by solid lines in FIG. 6. In turn, the switches 10-1 to 10-4 are connected to the controller 20 by control channels indicated by broken lines in FIG. 6. By the way, symbols such as #1-1 in FIG. 6 denote port numbers of the switches 10-1 to 10-4.

Figure 7:
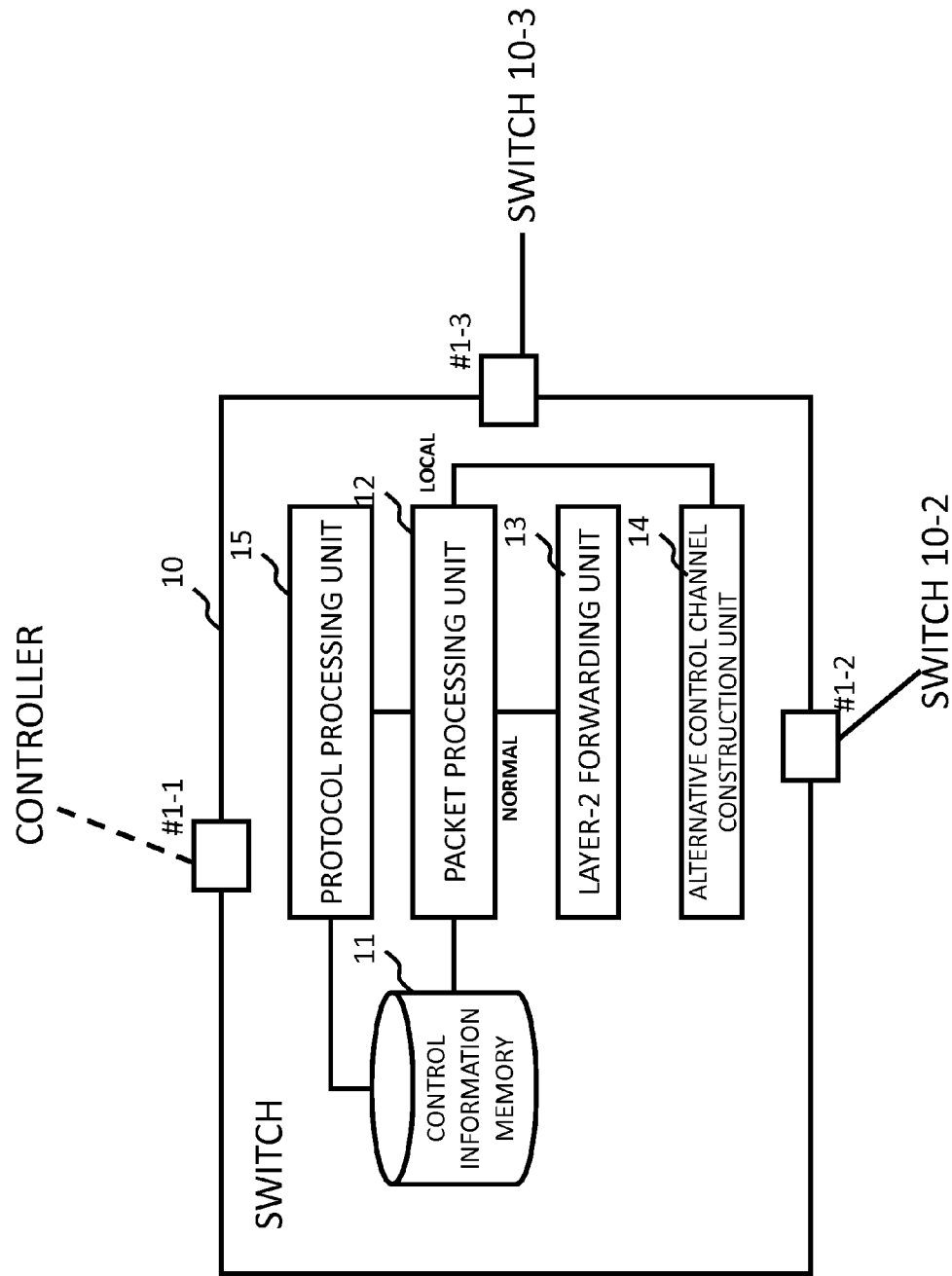
FIG. 7 is a block diagram showing a configuration of a switch according to the exemplary embodiment 1.

FIG. 7 schematically shows a configuration of each of the switches of the exemplary embodiment 1. Note that, if no distinction needs to be made among the switches 10-1 to 10-4, each switch is indicated as 'switch 10'. Referring to FIG. 7, the switch shown includes a control information memory 11, a packet processing unit 12, a Layer-2 forwarding unit 13, an alternative control channel construction unit 14 and a protocol processing unit 15. It should be noted that symbols such as #1-1 in FIG. 7 denote port numbers corresponding to those of FIG. 6. LOCAL denotes a local port provided within the switch and connected to the alternative control channel construction unit 14, and NORMAL a normal port provided within the switch and connected to the Layer-2 forwarding unit 13.

The control information memory 11 is storing the control information (flow entries) transmitted from the controller 20. FIG. 8 shows an example table storing the control information (flow entries). Each flow entry (control information) is made up of a set of matching conditions to match against a header etc. of a received packet, a set of instructions stipulating the contents of the processing to be applied to a packet matching the matching conditions, and priority levels indicating the priority order of the flow entries.

On receipt of a packet, the packet processing unit 12 retrieves the control information memory 11 to search for the control information (flow entry) having matching conditions matching the received packet, and executes the content of the processing stipulated in the instruction field of the control information, such as forwarding out a specified port, header modification or packet dropping. For example, it is supposed that the control information (flow entry) shown in FIG. 8 has been stored, and such a packet has been received in which a source MAC address (SMAC) is a MAC address of the controller 20 and a destination MAC address (DMAC) coincides with a MAC address of an own port of the switch 10-1. The switch 10-1 then outputs the packet out its LOCAL port. If no control information (flow entry) having the match condition matching the received packet has been stored in the control information memory 11, the packet processing unit 12 transmits the information of the received packet via the protocol processing unit 15 to the controller 20 to request the controller to generate and send the control information (flow entry). This request is equivalent to the Packet-In message of Non-Patent Literature 2. By the way, the operation of requesting the transmission of the control information (flow entry) is carried out in case the request for transmission of the control information has been set as an instruction in the control information (flow entry) as well.

The Layer-2 forwarding unit 13 is storing a MAC address table, and performs the following processing: First, on receipt of a packet, the Layer-2 forwarding unit 13 references a source MAC address of an Ethernet frame header of the packet. If there is no relevant entry in the MAC address table, the MAC address is registered in the MAC address table as the MAC address is mated with the port where the packet has been received. If there is a relevant entry in the MAC address table, the Layer-2 forwarding unit 13 outputs the received packet out a port mated with the MAC address of the entry. If there is no relevant entry in the MAC address table, the Layer-2 forwarding unit 13 outputs the packet out all ports other than the port that received the packet (flooding).

It is now supposed that disconnection of a control channel is found from e.g., a port failure of the port #1-1 connecting to the controller 20. In this case, the alternative control channel construction unit 14 outputs an ARP (Address Resolution Protocol) packet out the total of ports connecting to the switches. The ARP packet is a packet that requests the resolution of the MAC address of the controller 20. In a neighbored switch or switches, the packet is sent to the controller 20 by an operation performed in case no control information (flow entry) matching a received packet is stored in the control information memory 11 as previously mentioned.

On receipt of a response packet to the above mentioned ARP request packet, the alternative control channel construction unit 14 transmits a control packet to the controller 20 with a MAC address stated in the response packet as a destination. This control packet is sent to the controller 20 via the Layer-2 forwarding unit 13 of the neighbored switch 10. The above constructs an alternative control channel.

The protocol processing unit 15 communicates with the controller 20 in accordance with a preset protocol, such as the OpenFlow protocol of the Non-Patent Literature 2, in order to perform a series of operations. These operations may include an operation of storing the control information (flow entries), received from the controller 20, in the control information memory 11, an operation of removing the control information (flow entries), specified by the controller 20, from the control information memory 11, and so forth.

It should be noted that the switch 10, provided with the Layer-2 forwarding unit 13, as described above, can be constructed by adding the alternative control channel construction unit 14 to the switch prescribed as the 'Hybrid Switch' in the Non-Patent Literature 2. Reference may be made to '5.1 Pipeline Processing' of Non-Patent Literature 2.

Figure 9:
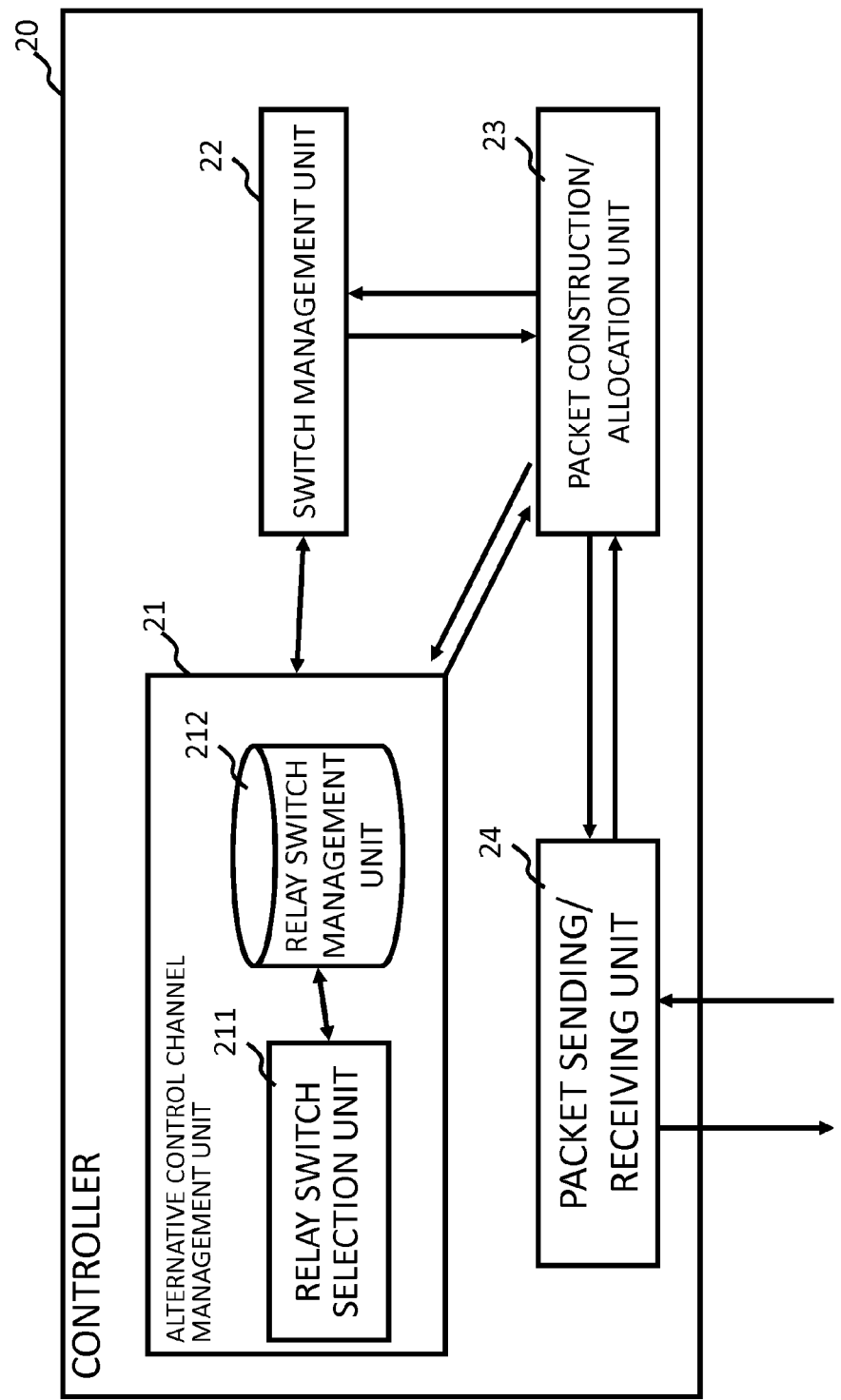
FIG. 9 is a block diagram showing a configuration of a controller according to the exemplary embodiment 1.

A configuration of the controller 20 of the subject exemplary embodiment will now be described. FIG. 9 shows a configuration of the controller 20 of the exemplary embodiment 1. There is shown in FIG. 9 a configuration including an alternative control channel management unit 21, a switch management unit 22, a packet construction/allocation unit 23 and a packet sending/receiving unit 24.

The alternative control channel management unit 21 is a module supervising the information of a switch (relay switch) that proves an alternative route to be in use at the time of a disconnection at the control channel. In an instance of FIG. 9, the alternative control channel management unit 21 includes a relay switch selection unit 211 and a relay switch management unit 212. On receipt of the ARP request packet from the switch 10 that has detected the disconnection of the control channel, the relay switch selection unit 211 references the relay switch management unit 212 to check to see whether or not an alternative control channel has already been constructed in connection with the ARP request packet in question, viz., whether or not an ARP request packet has already been received via another switch or switches and an ARP response has already been sent. The relay switch selection unit then transmits an ARP response packet.

FIG. 10 shows an instance of the relay switch information stored in the relay switch management unit 212. In the instance of FIG. 10, an IP address of the switch that has detected control channel disconnection is stored in a control channel connection destination switch field, and the information concerning a switch or switches and switch port(s) on the alternative control channel for the switch is stored in a relay switch field.

On receipt of the ARP request packet, the relay switch selection unit 211 checks to see whether or not there already exists an entry corresponding to the switch of the packet's transmission source. If the result of the check indicates that there exists no entry corresponding to the switch of the transmission source, the relay switch selection unit 211 stores in the relay switch management unit 212 the information concerning the switch of the source of transmission of the ARP request packet as well as the information concerning the switch that has relayed the ARP. In addition, the relay switch selection unit 211 transmits a response to the source of transmission of the ARP request packet. If conversely the result of the check shows that there already exists the entry corresponding to the switch of the transmission source, the information necessary for constructing the alternative control channel (MAC address of the controller 20) has already arrived at the switch 10 of the transmission source. The relay switch selection unit 211 thus causes the ARP request packet to be dropped.

The switch management unit 22 is a module supervising the switches connected to the controller 20. For example, the switch management unit 22 performs the operations of generating and transmitting the above mentioned control information (flow entries) in response to a request for transmission of the control information (flow entries) from each switch 10. To generate the above mentioned control information (flow entries), the switch management unit 22 is storing the information concerning the network topology of the switches 10 and the port information owned by the respective switches.

The packet construction/allocation unit 23 performs the operations of encapsulating each packet to be transmitted to the switch 10, assembling packets received from the switch 10 and allocating the so assembled packets to the alternative control channel management unit 21 or to the switch management unit 22. Specifically, the packet construction/allocation unit 23 performs the operations of sending the ARP request packet, transmitted from the switch 10, to the alternative control channel management unit 21, and outputting the ARP response packet, delivered from the alternative control channel management unit 21, to a packet transmitting module.

The packet sending/receiving unit 24 is a module taking charge of sending and receiving a packet between it and the switch 10 via a control channel or an alternative control channel.

The above described controller 20 can be constructed by providing an OpenFlow controller of Non-Patent Literature 2, as a basic unit, with the alternative control channel management unit 21 and with the function of packet allocation to the alternative control channel management unit 21.

It should be noted that respective components (processing means) of the switch 10 and the controller 20 shown in FIG. 1 can also be implemented by a computer program that causes a computer constituting each of these components to execute the above mentioned processing operations using the computer hardware resources.

The operation of the exemplary embodiment 1 will now be described in detail with reference to the drawings. In the following, the operation of the subject exemplary embodiment will be described in terms of four phases, that is, 'initial setting', 'sending an ARP request following disconnection of the control channel', 'sending an ARP response' and 'establishing an alternative control channel'.

[Initial Setting]

Figure 11:
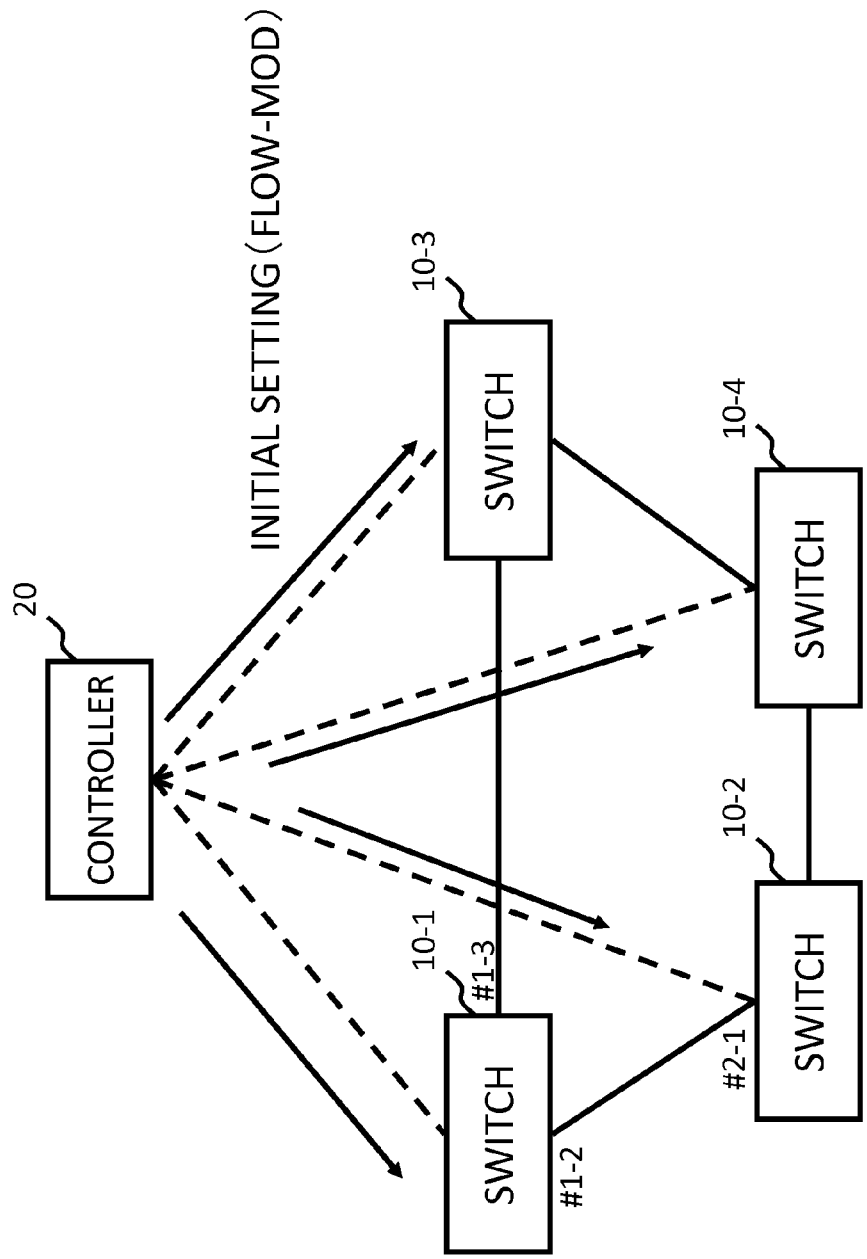
FIG. 11 is a block diagram for illustrating the operation of the controller of the exemplary embodiment 1.

FIG. 11 schematically shows the operation of initial setting by the controller 20 of the subject exemplary embodiment. When a control channel to each of the switches 10 has been established, the controller 20 sets, by way of the initial setting, the control information (flow entries) that causes each switch 10 to execute the following processing operations (1) to (3). That is, (1) the packets addressed to the controller 20 are sent by the Layer-2 forwarding unit 13. For example, the control information (flow entry) at the next-to-bottommost row of FIG. 8 is set in each switch. By the way, in the instance of FIG. 8, an instruction to output a packet having a match condition of DMAC (destination MAC address)=MAC address of the controller out a normal port (Layer-2 reserved port) is set. Thus, a relevant packet received is forwarded by the Layer-2 forwarding unit 13 out the normal port. It should be noted that the normal port (Layer-2 reserved port) is equivalent to the 'Normal' port prescribed in the Non-Patent Literature 2 as a reserved port of a 'Hybrid Switch' having the Layer-2 forwarding function.

(2) A packet arriving from the controller 20 is forwarded by the Layer-2 forwarding unit 13. For example, the control information (flow entry) at the bottommost row of FIG. 8 is set in each switch. By the way, in the example of FIG. 8, an instruction to output a packet having a match condition (transmission source MAC address)=MAC address of the controller out a normal port (Layer-2 reserved port) is set. Thus, a relevant packet received is forwarded by the Layer-2 forwarding unit 13, as is the control information (flow entry) of (1) above.

(3) A packet arriving at a switch from the controller 20 and whose destination MAC address is a MAC address donated to a port of the switch is determined to be a control packet addressed to the switch itself, and is sent to its alternative control channel construction unit 14. For example, the control information (flow entry) at the topmost row and that at the next-to-topmost row in FIG. 8 is set in each switch. In the instance of FIG. 8, an instruction to output the relevant packet out a local port is set. By the way, the local port is a port connected to the alternative control channel construction unit 14 within the switch and is equivalent to the 'Local' port provided as a reserved port in the Non-Patent Literature 2.

By setting the control information (flow entries), shown in FIG. 8, in each switch, the initial setting comes to a close to enable construction of an alternative control channel. It should be noted that part of the match conditions of the control information (flow entries) implementing the above mentioned processing is overlapped. Thus, in the instance of FIG. 8, higher priority levels are donated to the control information (flow entries), for which highly intricate match conditions are set, so that such control information (flow entries) will preferentially be applied.

[Forwarding of an ARP Request Following the Disconnection of a Control Channel]

Figure 12:
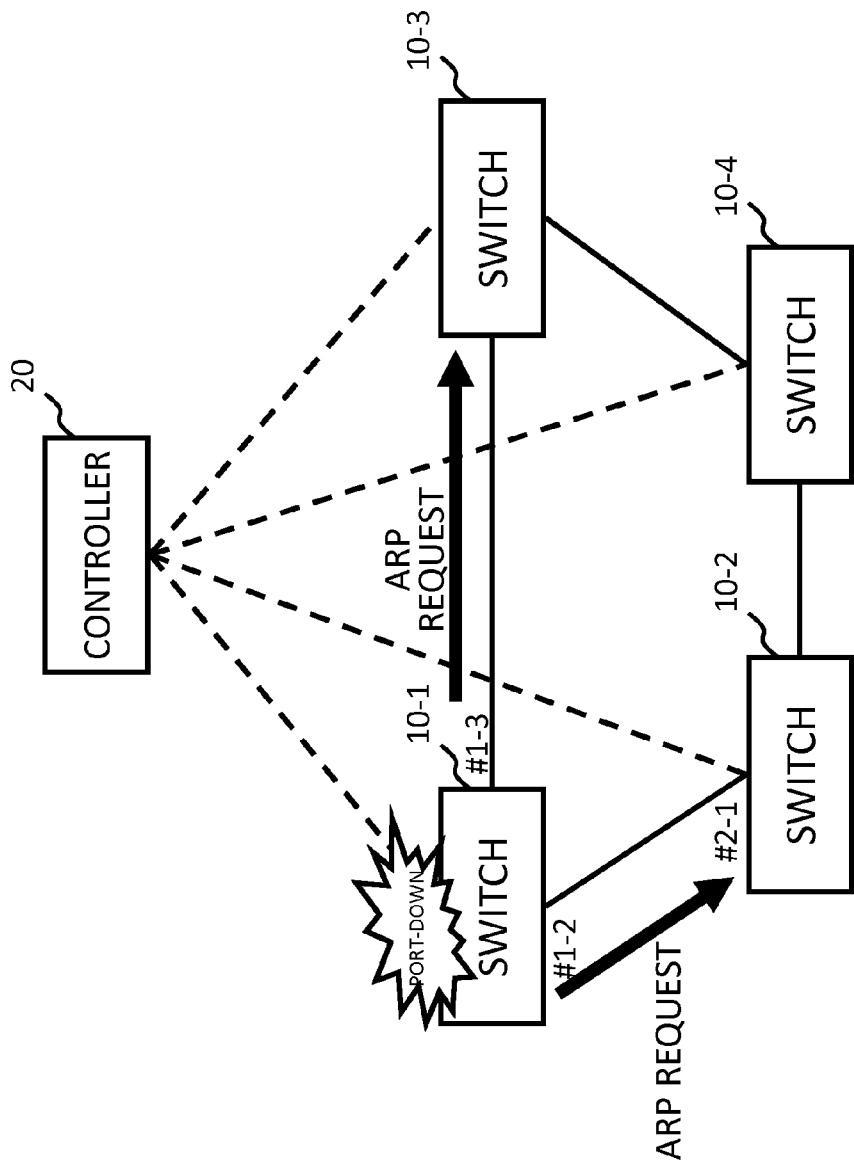
FIG. 12 is block diagram for illustrating the operation of the controller of the exemplary embodiment 1.

FIG. 12 shows an operation in case of detection of a control channel disconnection at the switch 10-1 in the subject exemplary embodiment. Referring to FIG. 12, on detection of a disconnection of a control channel, the switch 10-1 transmits an ARP request packet for the controller out its ports connecting to other switches 10-2, 10-3.

Figure 13:
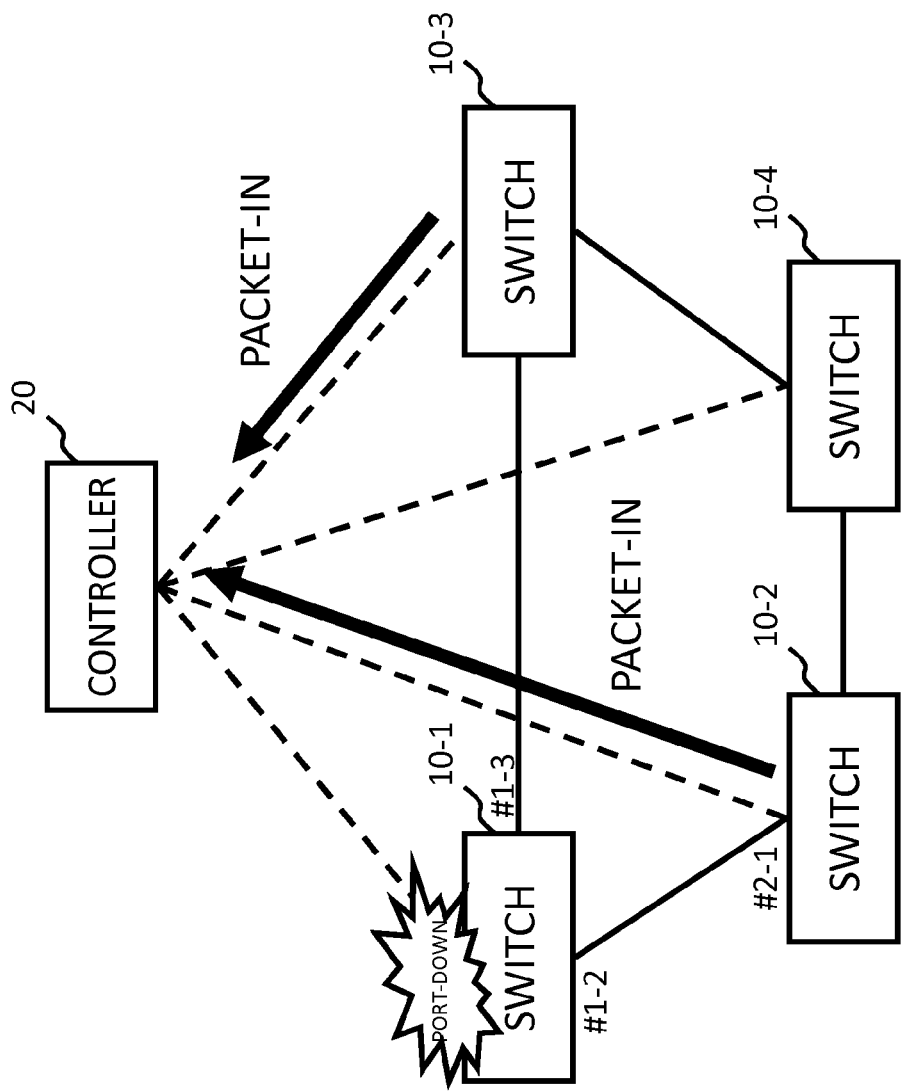
FIG. 13 is block diagram for illustrating the operation of the controller of the exemplary embodiment 1.

The switches 10-2, 10-3 that received the ARP request packets do not possess the control information (flow entries) having match conditions matching the ARP request packets. Consequently, as indicated in FIG. 13, these switches forward the ARP request packets received to the controller 20 to request it to send the control information or flow entries (Packet-In message).

The above transmits the ARP request packet to the controller 20 at the time of the control channel disconnection. It should be noted that the ARP request packet may also be sent to the controller 20 of FIG. 13 by setting the control information (flow entries) to send the ARP request packet to the controller 20 at each switch at the time of the initial setting.

[Forwarding the ARP Response]

Figure 14:
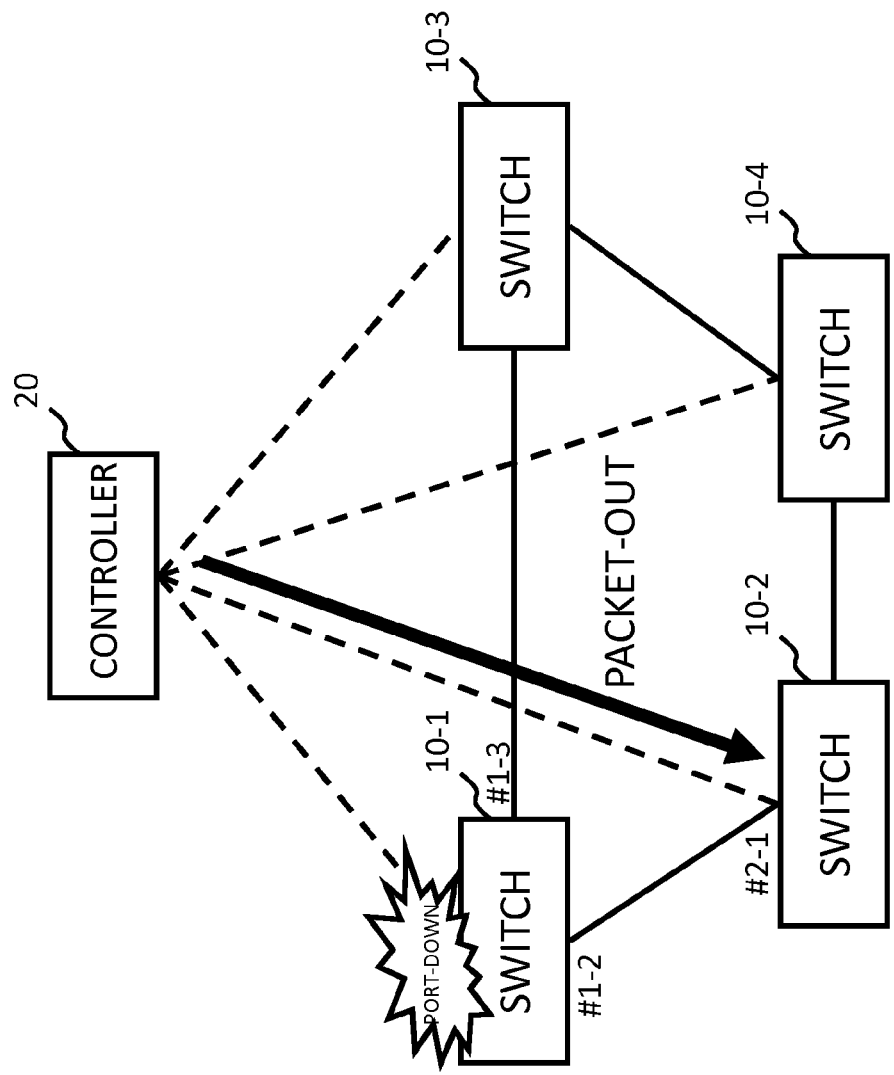
FIG. 14 is block diagram for illustrating the operation of the controller of the exemplary embodiment 1.

On receipt of the ARP request packet, the controller 20 selects either the switch 10-2 or the switch 10-3 as a relay switch and instructs the so selected relay switch to output an ARP response packet as the controller specifies the port of connection to the switch 10-1. In the instance of FIG. 14, the ARP response packet from the switch 10-2 arrived earlier at the controller 20. Hence, the controller 20 selects the switch 10-2 as the relay switch, and instructs this switch to transmit the ARP response packet out its port #2-1. By the way, in the subject exemplary embodiment, outputting the ARP response packet is instructed using a Packet-Out message of Non-Patent Literature 2. In the subject exemplary embodiment, the switch from which the ARP request packet was received at an earlier timing, that is, the switch having a shorter channel length to the controller, is selected as the relay switch. Alternatively, the relay switch may also be selected by the controller 20 as the controller takes into account the performance of each switch or its location, that is, whether or not the switch has actually a shortest path length to the controller.

Figure 15:
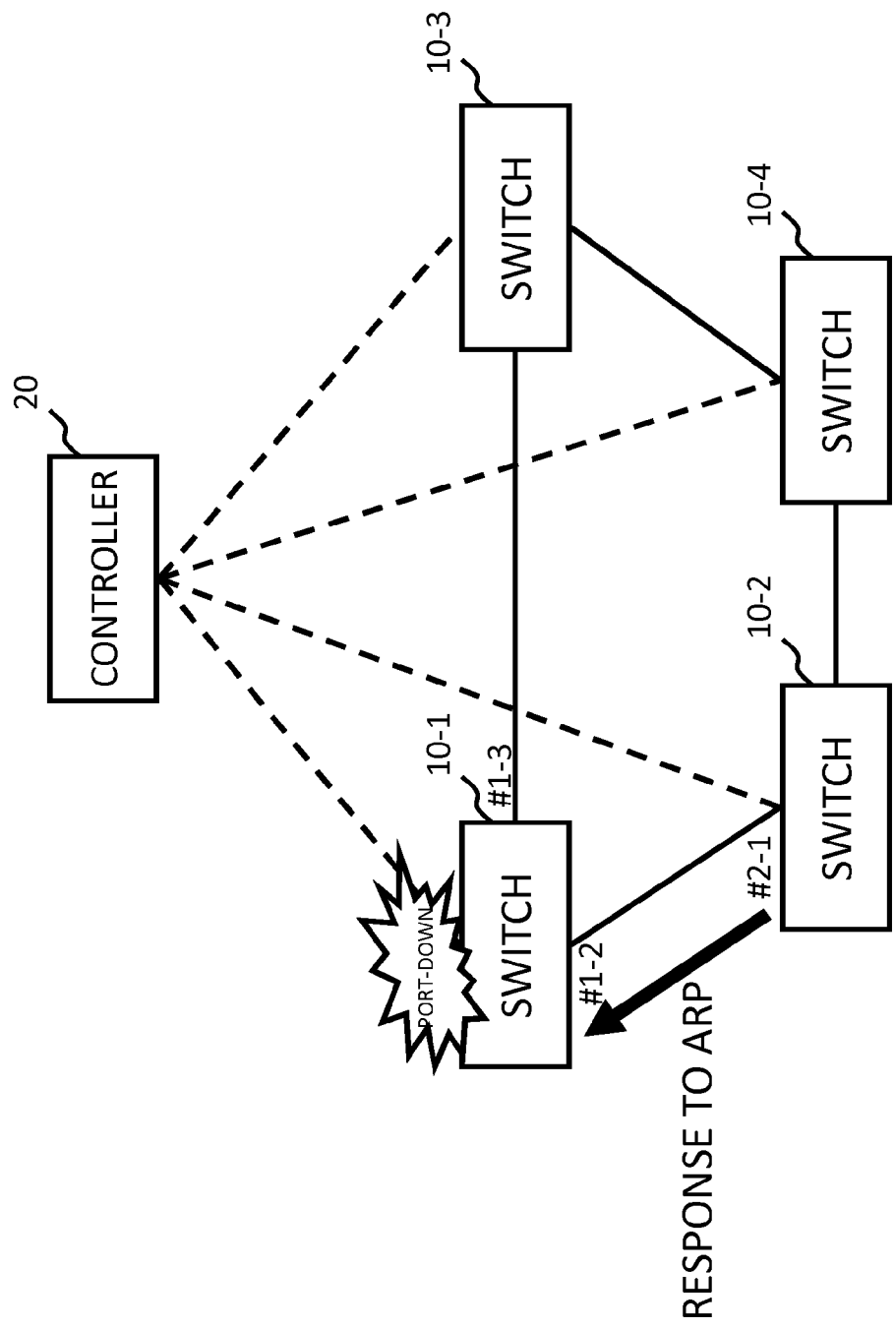
FIG. 15 is block diagram for illustrating the operation of the controller of the exemplary embodiment 1.

The switch 10-2 that received the Packet-Out message instructing outputting the above mentioned ARP response packet outputs the ARP response packet out the port specified in the Packet-Out message, as shown in FIG. 15. The ARP response packet from the controller 20 thus may arrive at the switch 10-1.

[Establishing an Alternative Control Channel]

It was from the switch 10-2 that the switch 10-1 received the ARP response packet. Thus, in accordance with the control information (flow entry) at the topmost row of FIG. 8, the switch 10-1 forwards the ARP response packet to the alternative control channel construction unit 14 out its inner local port.

On receipt of the ARP response packet, the alternative control channel construction unit 14 transmits a session connection request packet to the controller 20 out its port of receipt of the ARP response packet. On receipt of the session connection request, the switch 10-2 sends it to the controller 20, via the Layer-2 forwarding unit 13, in accordance with the control information (flow entry) to forward the packet addressed to the controller by Layer-2 processing, as set in the initial setting. It should be noted that flooding is carried out at this stage if the Layer-2 forwarding unit 13 of the switch 10-2 has not learned the MAC address of the controller 20 as well as its port. Of course, the controller 20 may transmit to the Layer-2 forwarding unit 13 of the switch 10-2 a packet configured to have the Layer-2 forwarding unit learn the MAC address of the controller itself so as to suppress the flooding.

On receipt of the session connection request packet, the controller 20 transmits the session connection request packet to the switch 10-1 via the switch 10-2. On receipt of the session connection response packet, the switch 10-2 forwards it to the switch 10-1 via the Layer-2 forwarding unit 13 in accordance with the control information (flow entry) to forward a packet having the controller 20 as the transmission source by Layer-2 processing, as set in the initial setting. Note that here the flooding is not performed because the Layer-2 forwarding unit 13 of the switch 10-2 has learned the MAC address of the switch 10-1 as well as its port at the time of forwarding the session connection request packet.

Figure 16:
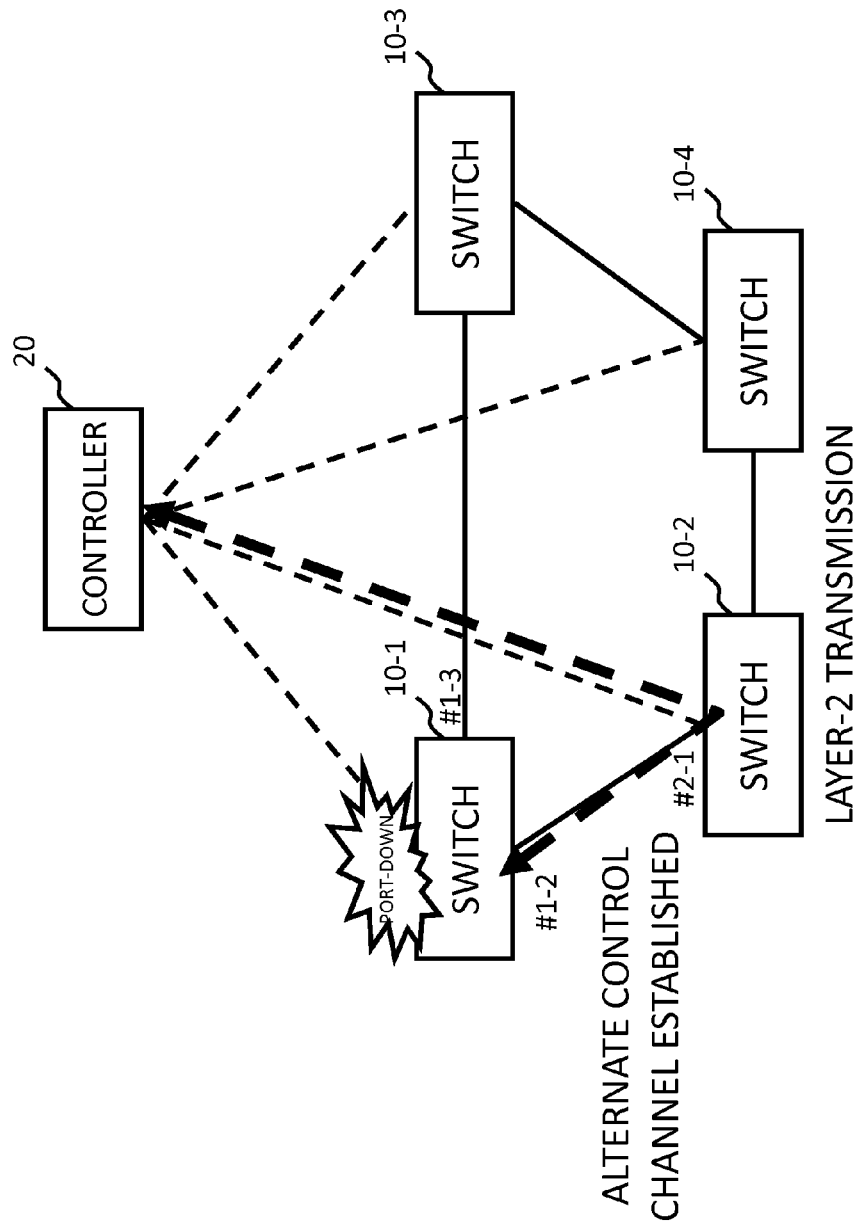
FIG. 16 is block diagram for illustrating the operation of the controller of the exemplary embodiment 1.

The session connection response packet thus arrives at the switch 10-1 to establish the alternative control channel, as shown in FIG. 16. Thenceforth, the controller 20 recommences controlling the switch 10-1. Note that, if the alternative control channel has also become disconnected, the 'forwarding of an ARP request following the disconnection of the control channel' as well as the next following operations is again performed to construct an alternative control channel, using the switch 10-3 as a relay switch this time.

With the subject exemplary embodiment, described above, redundancy of the control channels may be implemented without installing an additional physical link(s) between the controller 20 and the switch 10. The reason is that it has been made possible to construct an alternative control channel as long as there is a physical path over which the controller 20 can be reached via another switch or switches.

Although a preferred exemplary embodiment of the present invention has been described above, the present invention is not to be restricted to this particular mode, such that further changes, alternatives or adjustments may be made within the range not departing from the basic technical concept of the invention. For example, the configurations of networks or elements, shown in the drawings, are given merely as illustrations to assist in the understanding of the present invention which is not to be restricted to the configurations shown.

Figure 17:
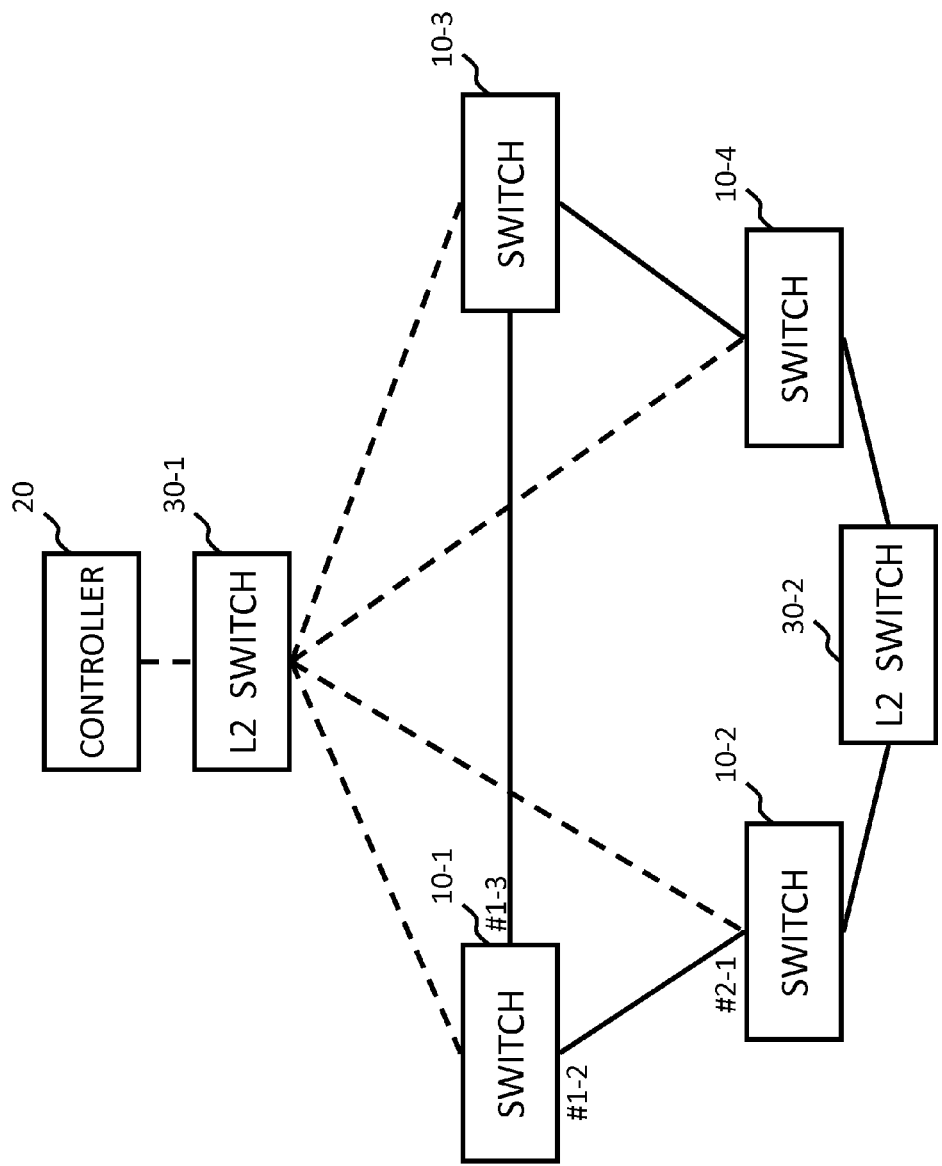
FIG. 17 is a block diagram showing a configuration of a communication system according to an exemplary embodiment 2.

For example, the present invention may be applied to a network where there is also provided a Layer-2 switch or switches, not susceptible to control from the controller 20, as shown in FIG. 17 (exemplary embodiment 2).

In FIG. 17, a Layer-2 switch, referred to below as an 'L2 switch' 30-1, is disposed between the controller 20 and each of the switches 10-1 to 10-4. In such case, if a link interconnecting the switch 10 and the L2 switch is disconnected, a series of ARP request packets commence to be sent, as in the exemplary embodiment 1, such that it is again possible to establish an alternative control channel by a sequence of operations similar to that described above. Note that, in the instance of FIG. 17, the L2-switch 30-1 learns the MAC table at a timing the session connection request packet is sent from a switch that has detected the disconnection of the control channel, for example, the switch 10-1, after a response has been made to the ARP request packet. It is also possible in this case for the controller 20 to send to the L2 switch 30-1 a packet to have the L2 switch learn a MAC address of the controller itself so as to suppress the flooding.

In FIG. 17, another L2 switch 30-2 is disposed between the switches 10-2 and 10-4 as well. In such case, an ARP request packet and an ARP response packet can again be forwarded unobjectionably. If, for example, the control channel of the switch 10-2 of FIG. 17 has become disconnected, the switch 10-2 sends an ARP request packet to the L2 switch 30-2 as well. At this stage, the L2 switch 30-2 learns the MAC address of the switch 10-2. By the L2 switch 30-2 flooding the ARP packet, the ARP packet reaches the switch 10-4. Thenceforth, the switch 10-4 requests the controller 20 to generate and send out the control information (flow entry), so that the ARP request packet may arrive at the controller 20 as in the exemplary embodiment 1. If the controller 20 has selected the switch 10-4 as the relay switch, the controller 20 instructs the switch 10-4 to output an ARP response packet to the L2 switch 30-2. Since the L2 switch 30-2 has learned the MAC address of the switch 10-2 at this stage, the ARP response packet arrives at the switch 10-2. On the other hand, since the L2 switch 30-2 learns the MAC address of the controller 20 at the time of reception of the ARP response packet, the session connection request packet, received from the switch 10-2, is also sent to the controller 20 over the switch 10-4.

The present invention may also be applied to the in-band control system, described in Non-Patent Literature 3, although no reference has been made thereto in the above described exemplary embodiment 1.

Ultimately, certain preferred modes of the present invention will be summarized.

[Mode 1]
(Reference is made to the communication system according to the first aspect).

[Mode 2]
The communication system according to mode 1, wherein, on detection of a disconnection of the control channel, the switch transmits a packet requesting the resolution of the Layer-2 address of the controller to each of the total of the neighboring switch or switches; the controller including an alternative control channel management unit that responds to one of the packets requesting the resolution of the Layer-2 address of the controller.

[Mode 3]
The communication system according to mode 2, wherein,
the alternative control channel management unit responds to a first one of arriving packets requesting the resolution of the Layer-2 address of the controller.

[Mode 4]
The communication system according to any one of modes 1 to 3, wherein,
the controller sets in each switch at the outset the control information instructing forwarding the control packet between the controller and the another switch or switches by the Layer-2 forwarding unit.

[Mode 5]
The communication system according to any one of modes 1 to 4, wherein,
a Layer-2 switch or switches is arranged between the controller and one out of the switch and the another switch or switches or between two out of the switch and the another switch or switches.

[Mode 6]
(Reference is made to the switch according to the second aspect).

[Mode 7]
The switch according to mode 6, wherein,
on detection of a disconnection of the control channel, a packet requesting the resolution of the Layer-2 address of the controller is transmitted to each of the total of the neighboring switches.

[Mode 8]
The switch according to mode 6 or 7, wherein,
the control packet between the controller and the another switch or switches is forwarded by the Layer-2 forwarding unit based on the control information as set from the controller.

[Mode 9]
(Reference is made to the controller according to the third aspect).

[Mode 10]
(Reference is made to the method for constructing a control channel according to the fourth aspect).

[Mode 11]
(Reference is made to the program according to the fifth aspect).

It should be noted that the modes 10 and 11 can be expanded to the modes 2 to 5, similarly to the mode 1 above.

The disclosures of the above mentioned non-Patent Literatures are to be incorporated herein by reference. The exemplary embodiments or Examples may be modified or adjusted within the concept of the total disclosures of the present invention, inclusive of claims, based on the fundamental technical concept of the invention. A series of combinations or selections of elements herein disclosed (elements of claims, Examples and drawings) may be made within the context of the claims of the present invention. That is, the present invention may include a wide variety of changes or corrections that may occur to those skilled in the art in accordance with the total disclosures inclusive of the claims and the drawings as well as the technical concept of the invention. In particular, it should be understood that any optional numerical figures or sub-ranges contained in the ranges of numerical values set out herein ought to be construed to be specifically stated even in the absence of explicit statements.

What is claimed is:
1. A communication system, comprising:
a controller; and
a first switch;
the controller configured to set control information in the first switch over a control channel to control the first switch;
the first switch including:
a processor; and
memory storing executable instructions that, when executed by the processor, causes the processor to perform as:
a packet processing unit configured to process a packet received based on the control information set by the controller;
a Layer-2 forwarding unit configured to determine an input port of a control packet between the con- troller and at least one other switch and to forward the control packet based on the determined results; and an alternative control channel construction unit that, on detecting a disconnection of the control channel, is configured to send a packet requesting a resolution of a Layer-2 address of the controller to at least one neighboring;

wherein the alternative control channel construction unit is configured to acquire the Layer-2 address from the controller via the at least one neighboring switch and transmit the control packet to the controller using the Layer-2 address acquired to construct a second control channel between the first switch and the controller.

2. The communication system according to claim 1, wherein, on detection of a disconnection of the control channel, the first switch is configured to transmit a packet requesting the resolution of the Layer-2 address of the controller to each of the at least one neighboring switch; wherein, the controller includes an alternative control channel management unit configured to respond to one of the packets requesting the resolution of the Layer-2 address of the controller.

3. The communication system according to claim 2, wherein, the alternative control channel management unit is configured to respond to a first one of arriving packets requesting the resolution of the Layer-2 address of the controller.

4. The communication system according to claim 1, wherein, the controller is configured to set in the first switch and each of the at least one other and at least one neighboring switches at the outset the control information instructing forwarding the control packet between the controller and the at least one other switch by the Layer-2 forwarding unit.

5. The communication system according to claim 1, wherein, at least one Layer-2 switch is arranged between the controller and one of the first switch and the at least one other switch or between the first switch and the at least one other switch.

6. A switch, comprising:

a processor; and memory storing executable instructions that, when executed by the processor, causes the processor to perform as:

a packet processing unit configured to process a packet received based on the control information set by a controller in the switch over a control channel to control the switch;

a Layer-2 forwarding unit configured to determine an input port of a control packet between the controller and at least one other switch to forward the control packet based on determined results; and an alternative control channel construction unit that, on detection of a disconnection of the control channel, is configured to transmit a packet requesting a resolution of a Layer-2 address of the controller to a at least one neighboring switch;

wherein the alternative control channel construction unit is configured to acquire the Layer-2 address from the controller via the at least one neighboring switch and transmit the control packet to the controller using the Layer-2 address acquired to construct a second control channel between the switch and the controller.

7. The switch according to claim 6; wherein, on detection of a disconnection of the control channel, a packet requesting the resolution of the Layer-2 address of the controller is transmitted to each of the at least one neighboring switch.

8. The switch according to claim 6, wherein, the control packet between the controller and the at least one another switch is forwarded by the Layer-2 forwarding unit based on the control information set by the controller.

9. A method for constructing a control channel comprising:

processing a packet received based on control information set from a controller in a switch over a control channel to control the switch, determining an input port of a control packet between the controller and at least one other switch to forward the control packet based on the determined results, forwarding, on detection of a disconnection of the control channel, a packet requesting a resolution of a Layer-2 address of the controller to at least one neighboring switch;

acquiring the Layer-2 address from the controller via the at least one neighboring switch; and sending the control packet to the controller using the Layer-2 address acquired to construct a second control channel between the switch and the controller.

* * * * *